US008787373B2

(12) United States Patent
Cors et al.

(10) Patent No.: US 8,787,373 B2
(45) Date of Patent: Jul. 22, 2014

(54) MULTICAST MISS NOTIFICATION FOR A DISTRIBUTED NETWORK SWITCH

(75) Inventors: Josep Cors, Rochester, MN (US); Todd A. Greenfield, Rochester, MN (US); David A. Shedivy, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/353,737

(22) Filed: Jan. 19, 2012

(65) Prior Publication Data

US 2013/0188637 A1 Jul. 25, 2013

(51) Int. Cl.
*H04L 12/28* (2006.01)

(52) U.S. Cl.
USPC .......................................................... 370/390

(58) Field of Classification Search
None
See application file for complete search history.

(56) References Cited

U.S. PATENT DOCUMENTS

| | | | |
|---|---|---|---|
| 5,265,092 A | 11/1993 | Soloway et al. | |
| 6,819,671 B1 | 11/2004 | Chen et al. | |
| 7,007,100 B1 | 2/2006 | Doong et al. | |
| 7,593,400 B2 | 9/2009 | Zelig et al. | |
| 7,738,454 B1 | 6/2010 | Panwar et al. | |
| 8,160,056 B2 | 4/2012 | Van der Merwe et al. | |
| 2004/0133634 A1 | 7/2004 | Luke et al. | |
| 2005/0220109 A1 | 10/2005 | Sudo et al. | |
| 2006/0018321 A1 | 1/2006 | Yamada et al. | |
| 2006/0036765 A1 | 2/2006 | Weyman | |
| 2006/0294211 A1 | 12/2006 | Amato | |
| 2007/0183334 A1 | 8/2007 | White et al. | |
| 2008/0062891 A1 | 3/2008 | Van der Merwe et al. | |
| 2008/0069100 A1 | 3/2008 | Weyman et al. | |
| 2008/0159144 A1 | 7/2008 | Nagarajan et al. | |
| 2008/0239957 A1 | 10/2008 | Tokura et al. | |
| 2008/0279188 A1 | 11/2008 | Alfieri et al. | |
| 2008/0304497 A1 | 12/2008 | Viswanath et al. | |
| 2009/0232139 A1 | 9/2009 | Kelley | |
| 2009/0274044 A1 | 11/2009 | Goose et al. | |
| 2010/0011028 A1 | 1/2010 | Dade | |
| 2010/0020795 A1 | 1/2010 | Devarajan et al. | |
| 2010/0254377 A1 | 10/2010 | Akella et al. | |
| 2010/0254378 A1 | 10/2010 | Akella et al. | |
| 2011/0051837 A1 | 3/2011 | Park et al. | |
| 2011/0261815 A1* | 10/2011 | Armstrong et al. | ........... 370/390 |
| 2011/0280248 A1 | 11/2011 | Singh et al. | |
| 2012/0257565 A1 | 10/2012 | Laroche et al. | |
| 2013/0028258 A1 | 1/2013 | Carney et al. | |

(Continued)

OTHER PUBLICATIONS

U.S. Patent Application entitled Synchronizing Routing Tables in a Distributed Network Switch, U.S. Appl. No. 13/363,434, filed Feb. 2, 2012.

(Continued)

*Primary Examiner* — Chi Pham
*Assistant Examiner* — Raul Rivas
(74) *Attorney, Agent, or Firm* — Patterson & Sheridan LLP

(57) ABSTRACT

Techniques are provided for multicast miss notification for a distributed network switch. In one embodiment, a bridge element in the distributed network switch receives a frame destined for a multicast group on a network. If a local multicast forwarding table of the bridge element does not include any forwarding entry for the multicast group, a forwarding entry is selected from the local multicast forwarding table as a candidate for being replaced. An indication of the candidate is sent to a management controller in the distributed network switch.

19 Claims, 7 Drawing Sheets

(56) References Cited

U.S. PATENT DOCUMENTS

| | | | |
|---|---|---|---|
| 2013/0044645 A1* | 2/2013 | Castro Castro et al. | 370/259 |
| 2013/0058338 A1* | 3/2013 | Guttman et al. | 370/390 |
| 2013/0188640 A1 | 7/2013 | Cors et al. | |
| 2013/0194964 A1 | 8/2013 | Basso et al. | |
| 2013/0195105 A1 | 8/2013 | Basso et al. | |
| 2013/0242985 A1 | 9/2013 | Basso et al. | |
| 2013/0242986 A1 | 9/2013 | Basso et al. | |
| 2013/0242988 A1 | 9/2013 | Basso et al. | |

OTHER PUBLICATIONS

U.S. Patent Application entitled Hashing-Based Routing Table Management, U.S. Appl. No. 13/597,386, filed Aug. 29, 2012.

U.S. Patent Application entitled Sliced Routing Table Management, U.S. Appl. No. 13/597,784, filed Aug. 29, 2012.

U.S. Patent Application entitled Sliced Routing Table Management With Replication, U.S. Appl. No. 13/597,807, filed Aug. 29, 2012.

U.S. Patent Application entitled Cached Routing Table Management, U.S. Appl. No. 13/597,636, filed Aug. 29, 2012.

US Patent Application entitled "Synchronizing Routing Tables in a Distributed Network Switch," U.S. Appl. No. 13/363,434, filed Feb. 1, 2012 by Claude Basso et al.

US Patent Application entitled "Hashing-Based Routing Table Management," U.S. Appl. No. 13/597,386, filed Aug. 29, 2012 by Claude Basso et al.

US Patent Application entitled "Sliced Routing Table Management," U.S. Appl. No. 13/597,784, filed Aug. 29, 2012 by Claude Basso et al.

US Patent Application entitled "Cached Routing Table Management," U.S. Appl. No. 13/597,636, filed Aug. 29, 2012 by Claude Basso et al.

US Patent Application entitled "Sliced Routing Table Management with Replication," U.S. Appl. No. 13/597,807, filed Aug. 29, 2012 by Claude Basso et al.

U.S. Appl. No. 13/597,386, entitled Hashing-Based Routing Table Management, filed Aug. 29, 2012.

U.S. Appl. No. 13/778,671, entitled Hashing-Based Routing Table Management, filed Feb. 27, 2013.

U.S. Appl. No. 13/597,784, entitled Sliced Routing Table Management, filed Aug. 29, 2012.

U.S. Appl. No. 13/778,400, entitled Sliced Routing Table Management, filed Feb. 27, 2013.

U.S. Appl. No. 13/597,636, entitled Cached Routing Table Management, filed Aug. 29, 2012.

U.S. Appl. No. 13/778,417, entitled Cached Routing Table Management, filed Feb. 27, 2013.

U.S. Appl. No. 13/597,807, entitled Sliced Routing Table Management With Replication, filed Aug. 29, 2012.

U.S. Appl. No. 13/778,450, entitled Sliced Routing Table Management With Replication, filed Feb. 27, 2013.

U.S. Patent Application entitled Sliced Routing Table Management With Replication, U.S. Appl. No. 14/242,455, filed Apr. 1, 2014.

\* cited by examiner

MULTICAST MISS NOTIFICATION FOR A DISTRIBUTED NETWORK SWITCH

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots as well as permit communication between servers in the same or different chassis.

Further, multiple switches may be combined to create a distributed network switch. However, the communication interface between the distributed network switch and the servers may become so busy that packets are dropped (or lost). That is, a server may transmit packets to a switch faster than the switch can process the received packets. If the buffer associated with the switch fills up, subsequent packets may be dropped. To avoid packet loss, a switch may instruct the server to temporarily stop sending packets to the switch. The switch may use this period of time to relieve network congestion.

SUMMARY

Embodiments of the invention provide a method, product and system for performing an operation for multicast miss notification in a distributed network switch that includes a first switch module. The operation includes receiving, by a bridge element of the first switch module, a frame destined for a multicast group on a network. The first switch module includes a management controller associated with a global multicast forwarding table that includes multiple forwarding entries. The bridge element is associated with a local multicast forwarding table specific to the bridge element and that includes a subset of the multiple forwarding entries. The operation also includes determining that the local multicast forwarding table associated with the bridge element does not include a forwarding entry for the multicast group for which the frame is addressed. The operation also includes selecting a first forwarding entry from the local multicast forwarding table as a candidate for replacing with a forwarding entry for the multicast group for which the frame is destined. The operation also includes sending, to the management controller, an indication that the first forwarding entry is the candidate for replacing with the forwarding entry for the multicast group for which the frame is destined.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
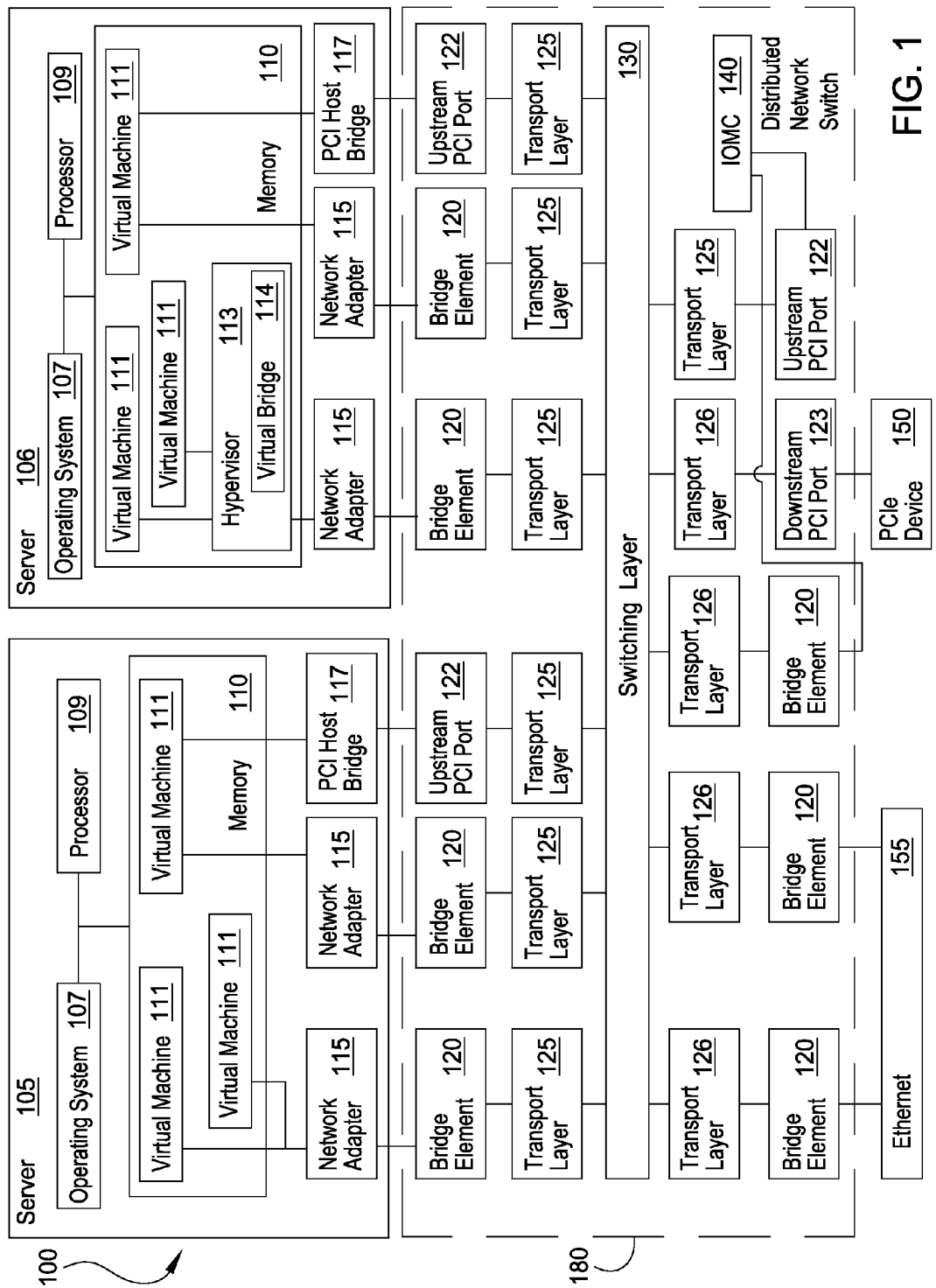
FIG. 1 illustrates a system architecture that includes a distributed network switch, according to one embodiment of the invention.

Embodiments of the invention provide techniques for multicast miss notification for a distributed network switch. One embodiment provides a bridge element configured to receive a frame destined for a multicast group on a network. If a local multicast forwarding table of the bridge element does not include any forwarding entry for the multicast group, the bridge element selects, based on predefined selection criteria, a forwarding entry from the local multicast forwarding table as a candidate for being replaced. The bridge element sends an indication of the candidate to a management controller in the distributed network switch. The management controller is configured to retrieve a forwarding entry for the multicast group from a global multicast forwarding table. The management controller is also configured to update the local multicast forwarding table of the bridge element, based on the retrieved forwarding entry and the indication. Accordingly, the forwarding entries in the local multicast forwarding table are managed in such a way as to reduce a likelihood of multicast groups not being found in the local multicast forwarding table. As a result, the distributed network switch may operate more efficiently at least in some cases.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture that includes a distributed network switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members.

Figure 2:
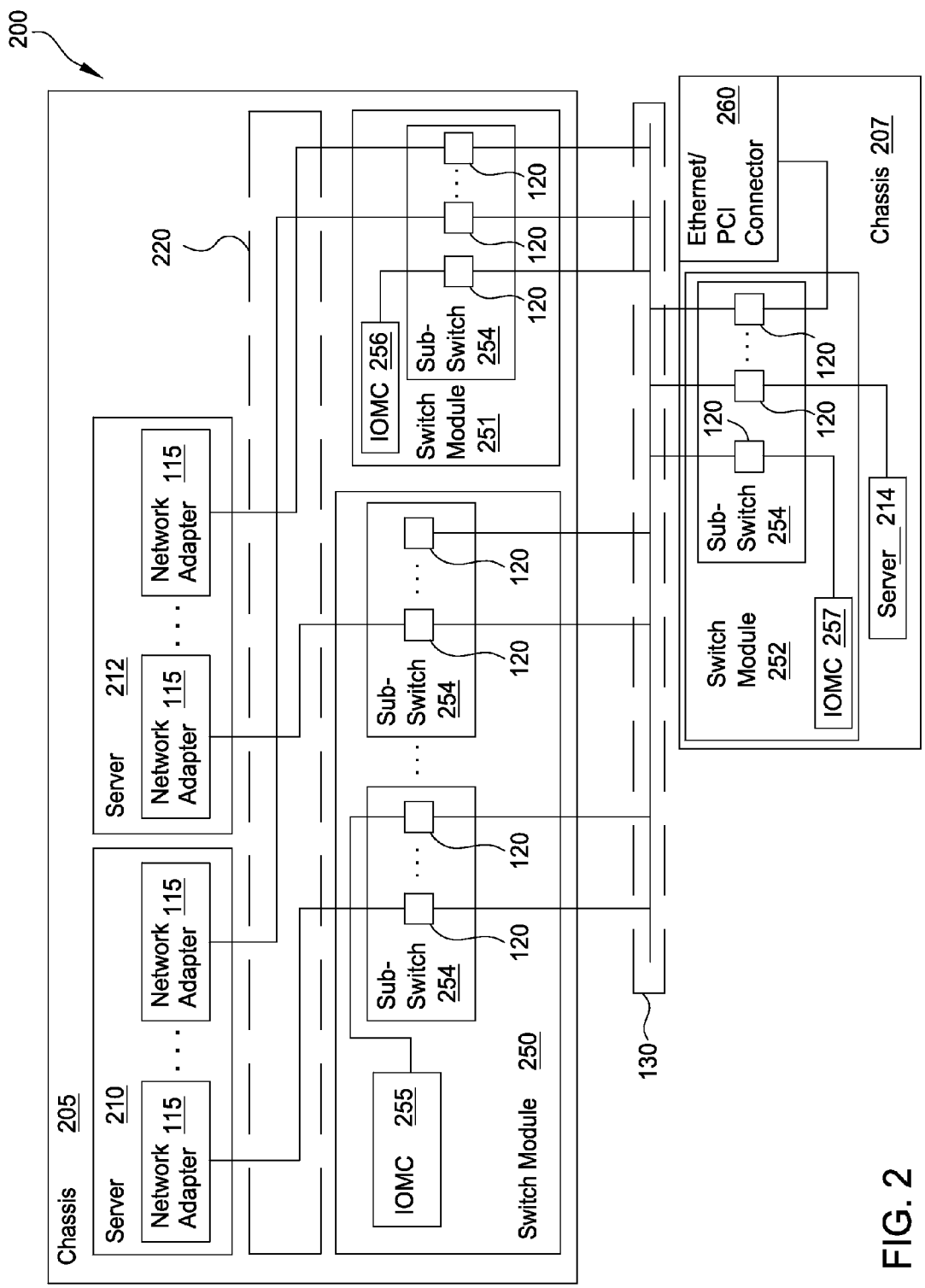
FIG. 2 illustrates the hardware representation of a system that implements a distributed network switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
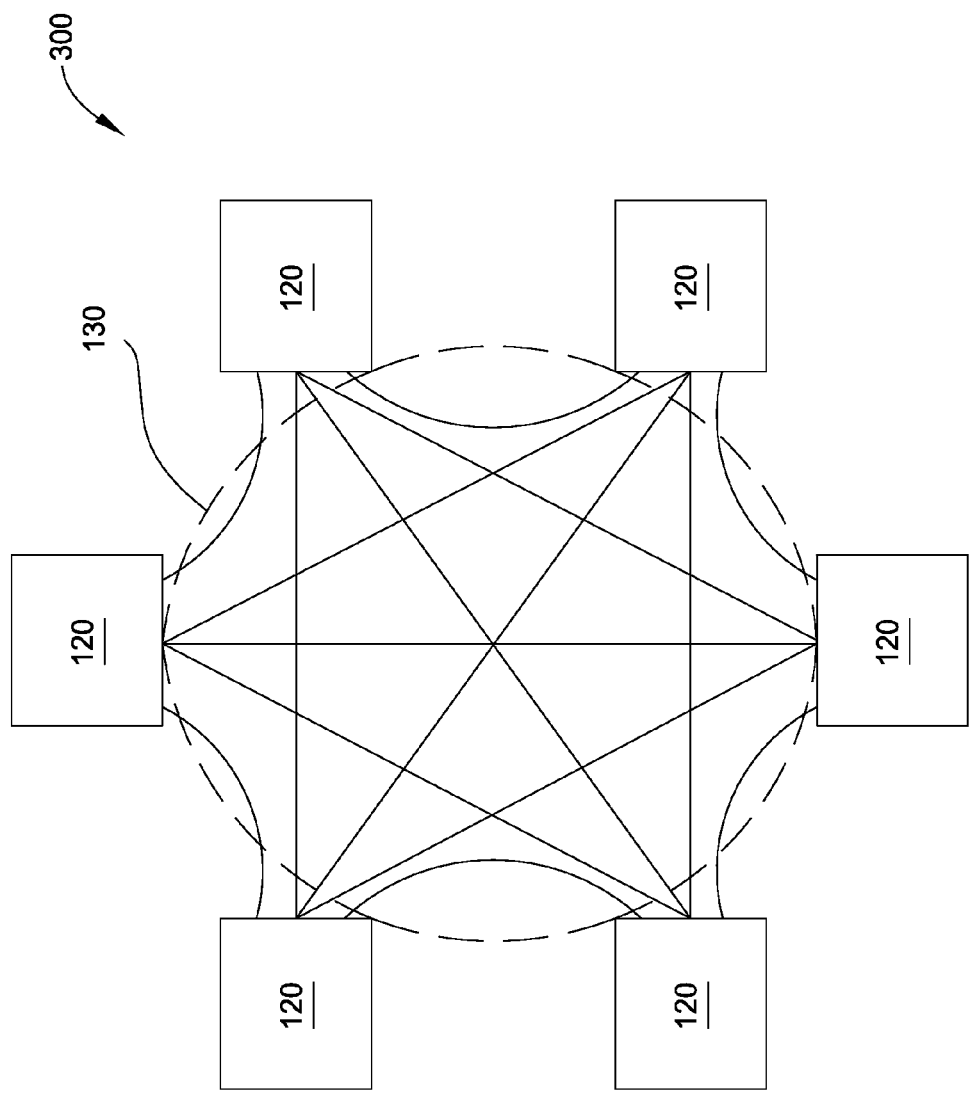
FIG. 3 illustrates a distributed network switch, according to one embodiment of the invention.

FIG. 3 illustrates a virtual switching layer, according to one embodiment of the invention. Each bridging element 120 in the systems 100 and 200 are connected to each other using the switching layer 130 via a mesh connection schema. That is, no matter the bridging element 120 used, a cell (i.e., data packet) can be routed to another other bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use four bridge elements, where each bridge element is a distributed Virtual Ethernet Bridge (dVEB) that supports data transfer rates of one hundred gigabits per second (100 Gbps). The dVEBs are managed by firmware executing on the management controller.

In one embodiment, the management controller is associated with a global multicast forwarding table that stores location information of each component in the networked system that is an intended recipient of a frame destined for a given multicast group. The stored location information may also be referred to as control information. The global multicast forwarding table stores a full set of forwarding entries, including a forwarding entry for each multicast group that is used within the set of racks in the networked system of which the management controller is part. Each forwarding entry may include a logical network associated with a destination multicast group of an ingress frame, a virtual local area network (VLAN) associated with the destination multicast group, and a Media Access Control (MAC) address associated with the destination multicast group.

In one embodiment, each dVEB is associated with a respective, local multicast forwarding table, which stores a subset of the forwarding entries found in the global multicast forwarding table. Because each switch module 250, 251 is distributed and may service a larger number of CNAs, the size of the local multicast forwarding table may often be limited. If a desired forwarding entry is not found in a local multicast forwarding table of a dVEB, the dVEB may request the management controller to update the local multicast forwarding table of the dVEB with the desired forwarding entry. In one embodiment, each local multicast forwarding table stores up to 1024 forwarding entries.

In one embodiment, when a bridge element processes an ingress frame destined for a multicast group but no entry for the multicast group is found in the local multicast forwarding table of the bridge element, the bridge element floods the frame to all members of the broadcast domain. The master controller updates the local multicast forwarding table to include the entry for the multicast group, to reduce a likelihood of a subsequent frame destined for the same multicast group also causing all members of the broadcast domain to be flooded with frames. However, in some circumstances, the local multicast forwarding table may be full. In such cases, the master controller may not necessarily have any information regarding which forwarding entries have been used and/or should remain in the forwarding table. Accordingly, in some cases, the master controller may replace a forwarding entry that, unbeknownst to the master controller, is a frequently accessed forwarding entry, resulting in an increased amount of flooding of frames.

In one embodiment, the bridge element is configured to assist the master controller in selecting a forwarding entry for replacement. If a local multicast forwarding table of the bridge element does not include any forwarding entry for the multicast group for which an ingress frame is destined, the bridge element selects, based on predefined selection criteria, a forwarding entry from the local multicast forwarding table as a candidate for being replaced. The bridge element sends an indication of the candidate to a management controller in the distributed network switch. In some embodiments, the selecting and/or the sending may be performed by a hardware state machine component within the bridge element. The management controller is configured to retrieve a forwarding entry for the multicast group from a global multicast forwarding table. The management controller is also configured to update the local multicast forwarding table of the bridge element, based on the retrieved forwarding entry and the indication. Accordingly, the forwarding entries in the local multicast forwarding table are managed in such a way as to reduce a likelihood of multicast groups not being found in the local multicast forwarding table. Consequently, the distributed network switch may operate more efficiently at least in some cases.

Figure 4:
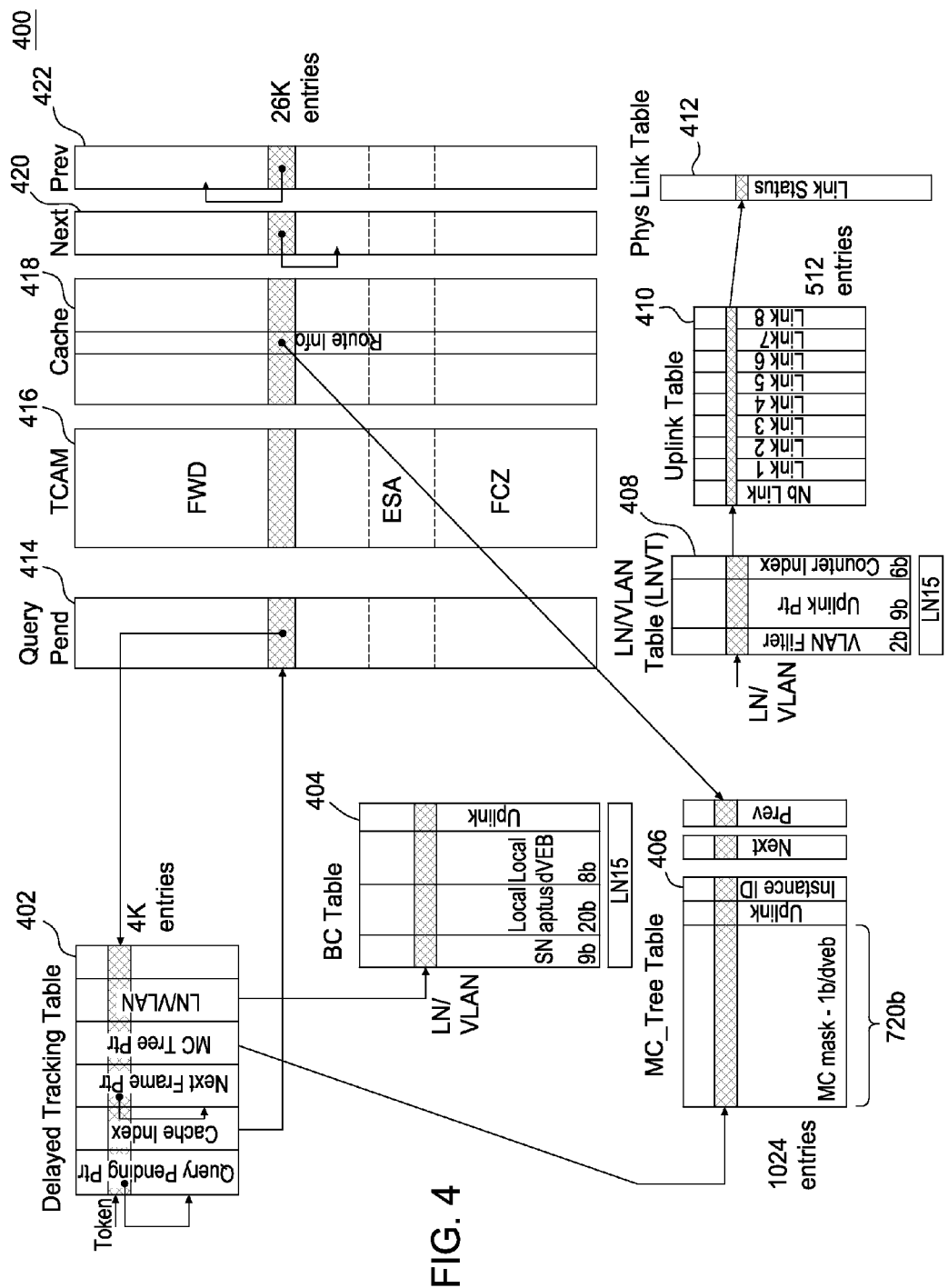
FIG. 4 illustrates data structures associated with a local multicast forwarding table, according to one embodiment of the invention.

FIG. 4 illustrates data structures 400 associated with a local multicast forwarding table, according to one embodiment of the invention. As shown, the data structures 400 include a delayed tracking table 402, a broadcast table 404, a multicast tree table 406, a logical network/VLAN (LN/VLAN) table 408, an uplink table 410, a physical link state table 412, a query pending data structure 414, a forwarding cache data structure 416, and next/previous data structures 420, 422. In one embodiment, the delayed tracking table 402 maintains state information used for a multicast replication engine for operations queued up for future processing. An example of such operations is the replication and sending of multicast frames. These operations can be delayed if the multicast group information is not available in the local cache. The broadcast table 404 is indexed by logical network/VLAN and stores a bitmap of switch modules to receive broadcast frames for a given broadcast domain.

In one embodiment, the multicast tree table 406 stores a bitmap of dVEBs in the distributed network switch. In one embodiment, a predetermined bit value (e.g., "1") is used to represent a dVEB containing a port that is a member of a given multicast group. The uplink table 410 identifies physical locations of member ports of an aggregated link. The physical link state table 412 stores status information of whether a physical link is operational. The query pending data structure 414 maintains a pointer back to an entry in the delayed tracking table 402, that initiated a query to the management controller. In effect, the pointer serves as a "breadcrumb" back to the original reason for the query operation. The forwarding cache data structure 416 maintains the key LN/VLAN/MAC for a cached forwarding entry. The forwarding cache data structure 416 may also be referred to as a TCAM data structure. The next/previous data structures 420, 422 are control structures configured to maintain used/unused entries in some embodiments.

Figure 5:
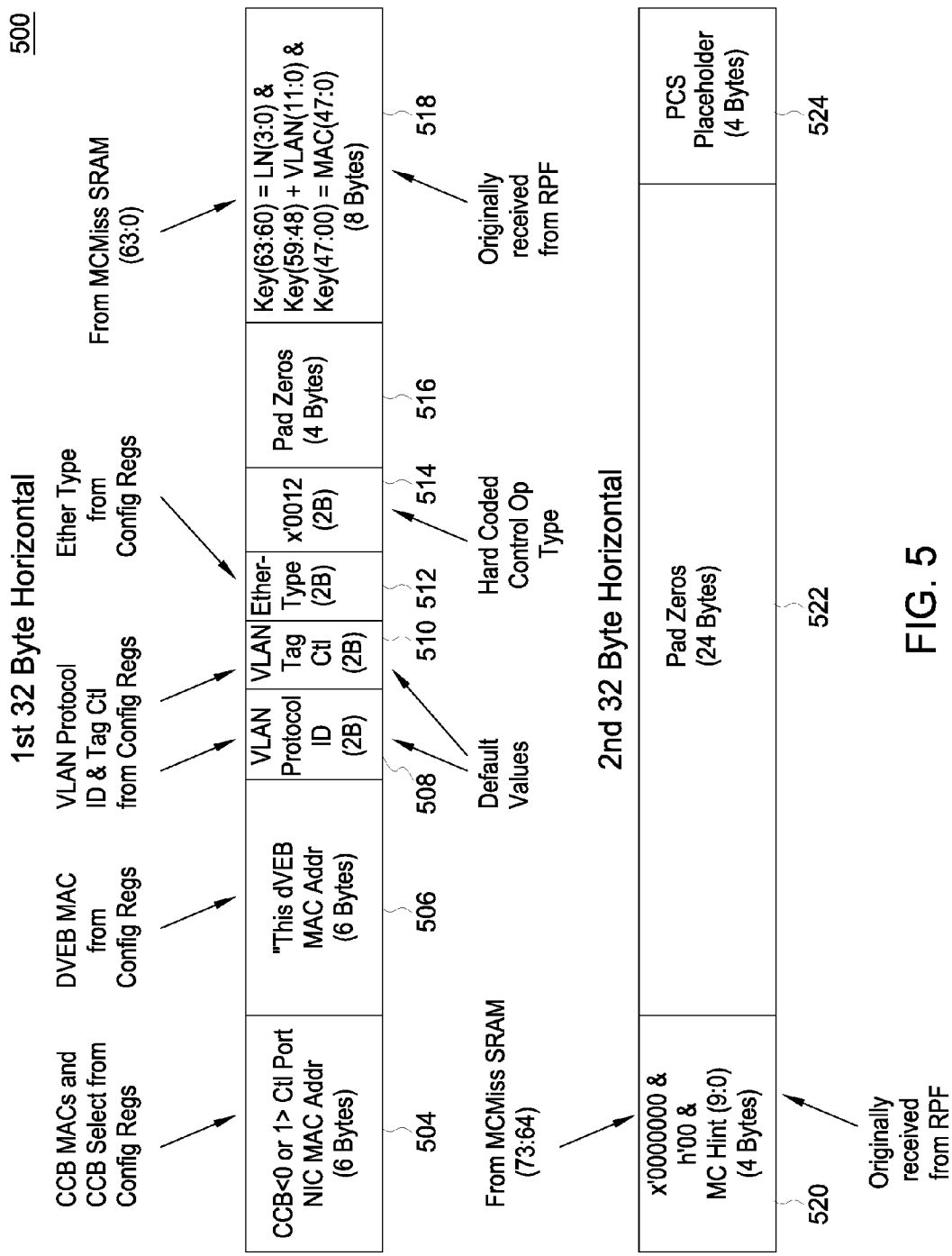
FIG. 5 illustrates a frame format for a multicast miss message, according to one embodiment of the invention.

FIG. 5 illustrates a frame format 500 for a multicast miss message, according to one embodiment of the invention. As shown, the frame format 500 includes a central controlling bridge (COB) MAC address field 504, a source MAC address field 506, a key field 518, a multicast hint field 520. In one embodiment, the COB is a firmware component that functions as a switch control point configured to receive packets for any additional processing required by the distributed network switch. The COB MAC address field 504 is configured to store a six-byte MAC address of the COB. The source MAC address field 506 is configured to store a six-byte MAC address of the generating dVEB. The key field 518 stores a key that missed (i.e., that is not found) in the forwarding cache data structure 416. The multicast hint field 520 provides a suggestion as to which multicast tree table entry should be replaced if an entry is to be added to the table in response to a miss. The multicast hint field 520 may specify an entry that is least recently used for forwarding. In one embodiment, the frame format 500 may also include other fields associated with an Ethernet frame format, such as a VLAN protocol ID 508, a VLAN tag 510, and EtherType field 512, a control op type field 514, and a frame check sequence (FCS) 524. The frame format 500 may also contain pad fields 516, 522 storing a predetermined number of bytes of 0×0 values.

Figure 6:
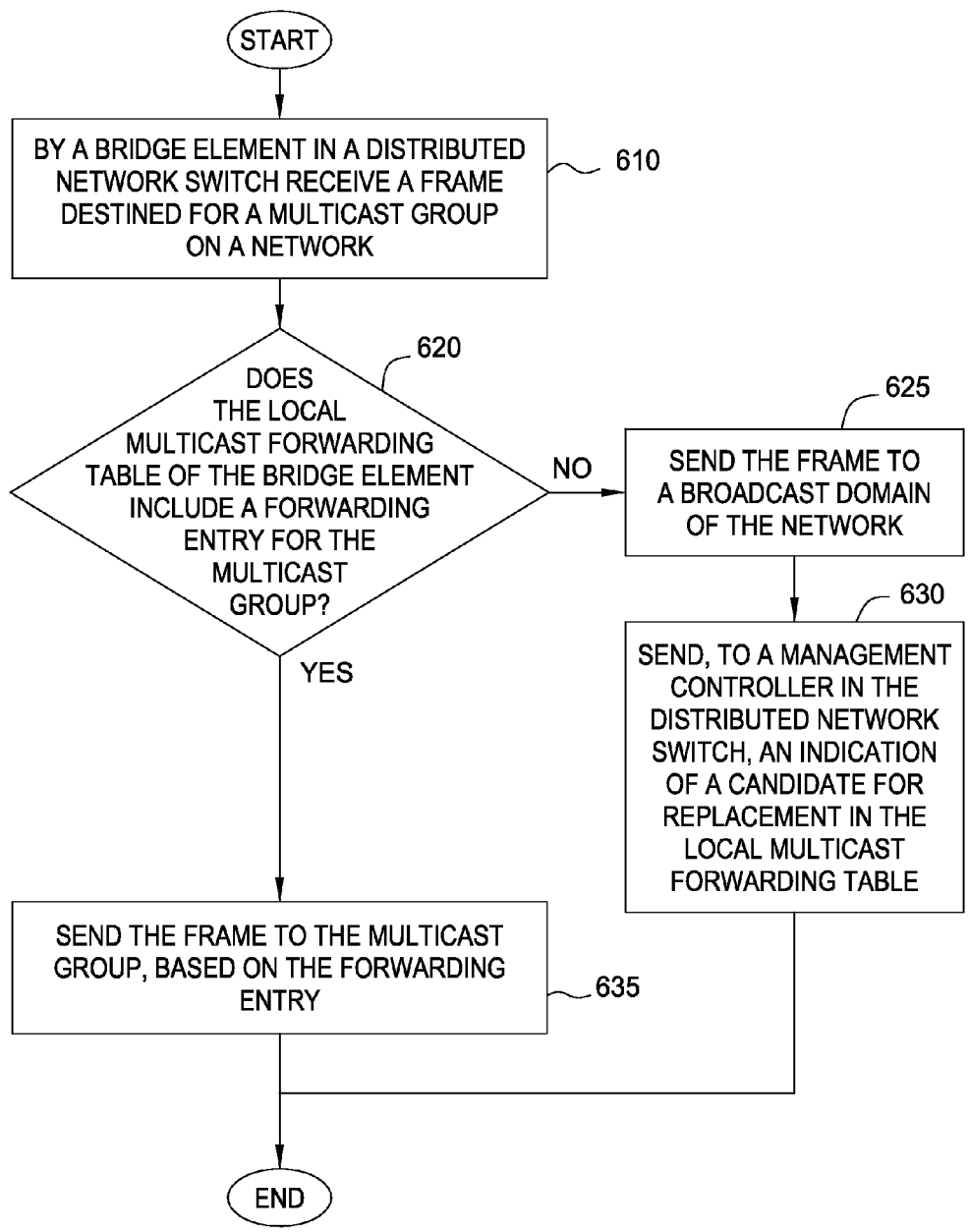
FIG. 6 is a flowchart depicting a method for multicast miss notification for a distributed network switch, according to one embodiment of the invention.

FIG. 6 is a flowchart depicting a method 600 for multicast miss notification for a distributed network switch, according to one embodiment of the invention. The method 600 begins at step 610, where a bridge element in the distributed network switch receives a frame destined for a multicast group on a network. At step 620, the bridge element determines whether the local multicast forwarding table of the bridge element includes a forwarding entry for the multicast group. The forwarding entry may include at least one of a logical network of the multicast group, a VLAN of the multicast group, and a MAC address for the multicast group.

In one embodiment, if the forwarding entry exists in the local multicast forwarding table (step 620), the bridge element sends the frame to the multicast group, based on the forwarding entry (step 630). Otherwise, the bridge element sends the frame to a broadcast domain of the network (625) and sends a notification of a miss in the multicast forwarding table and/or an indication of a candidate for replacement in the local multicast forwarding table (step 635). The notification and/or indication may be sent to a management controller in the distributed network switch. The candidate may be selected by the bridge element based on predetermined selection criteria, such as which forwarding entry in the local multicast forwarding table is the least recently accessed forwarding entry. To this end, the bridge element may be configured to monitor and/or track usage information regarding forwarding entries, in one or more internal data structures associated with the bridge element. Accordingly, the bridge element may apply the selection criteria based on the internal data structures. After the step 630 or the step 635, the method 600 terminates.

In an alternative embodiment, rather than sending the frame to the broadcast domain of the network (step 625), the bridge element may await an indication that the management controller has updated the local multicast forwarding table of the bridge element with the forwarding entry for the multicast group. Upon receiving the indication, the bridge element sends the frame to the multicast group, based on the forwarding entry. Doing so can avoid flooding the network with frames, at a cost of delaying the sending of the frame until the update of the local multicast forwarding table is complete. Whether the frame is sent to the broadcast domain on the network can be tailored to suit the needs of a particular case.

Figure 7:
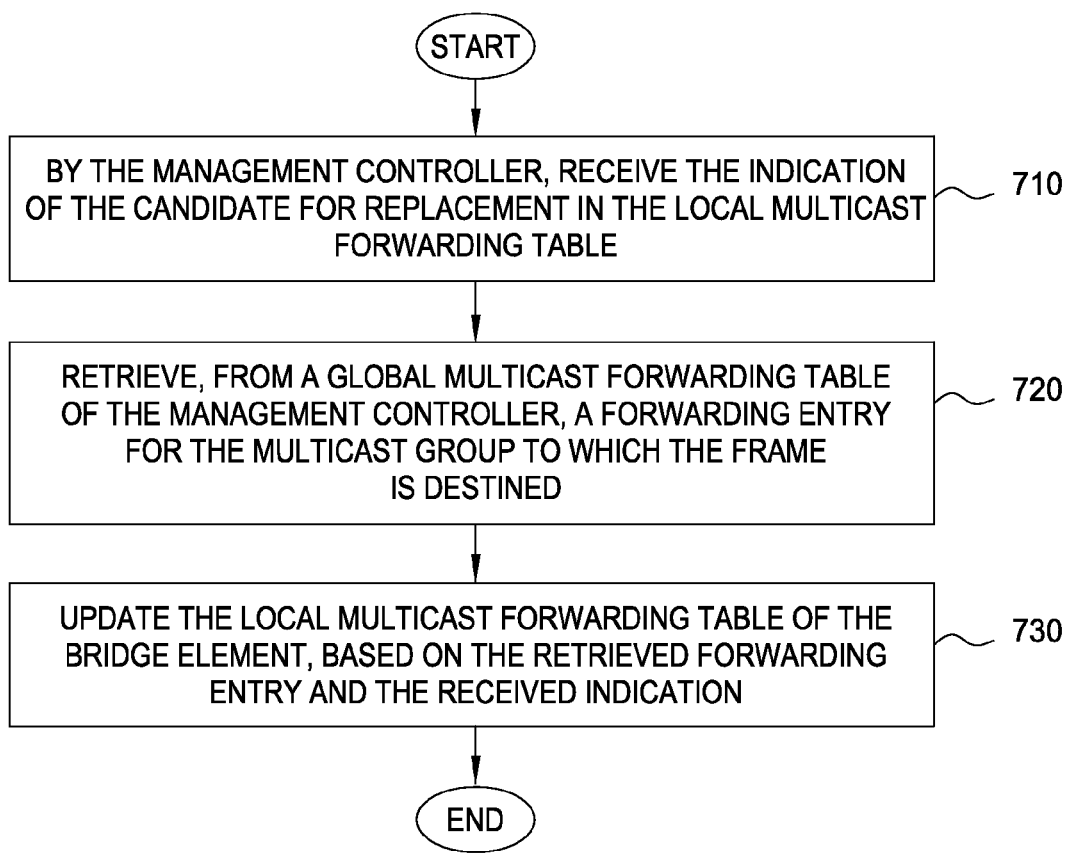
FIG. 7 is a flowchart depicting a method for managing the local multicast forwarding table of the bridge element in the distributed network switch, according to one embodiment of the invention.

FIG. 7 is a flowchart depicting a method 700 for managing the local multicast forwarding table of the bridge element in the distributed network switch, according to one embodiment of the invention. As shown, the method 700 begins at step 710, where the management controller receives, from the bridge element, the indication of the candidate for replacement in the local multicast forwarding table of the bridge element. At step 720, the management controller retrieves, from a global multicast forwarding table of the management controller, a forwarding entry for the multicast group to which the frame is destined.

At step 730, the management controller updates the local multicast forwarding table of the bridge element, based on the retrieved forwarding entry and the received indication. For example, the management controller may use the received indication as an index into the local multicast forwarding table, replacing the existing forwarding entry at the index with the retrieved forwarding entry. In an alternative embodiment, the indication serves merely as a hint to the management controller, and the management controller need not necessarily replace the indicated forwarding entry in the local multicast forwarding table. Instead, the management controller may be configured to select a different forwarding entry for replacement, based on additional predetermined criteria. For example, the management controller may select the different forwarding entry for having a lowest access frequency within a predefined historical time period, such as a time period of the previous ten minutes. After the step 730, the method 700 terminates.

Embodiments of the invention provide techniques for multicast miss notification for a distributed network switch. In one embodiment, a bridge element in the distributed network switch receives a frame destined for a multicast group on a network. If a local multicast forwarding table of the bridge element does not include any forwarding entry for the multicast group, the bridge element selects, based on predefined selection criteria, a forwarding entry from the local multicast forwarding table as a candidate for being replaced. The bridge element sends an indication of the candidate to a management controller in the distributed network switch. The management controller retrieves a forwarding entry for the multicast group from a global multicast forwarding table. The management controller updates the local multicast forwarding table of the bridge element, based on the retrieved forwarding entry and the indication. Accordingly, the forwarding entries in the local multicast forwarding table are managed in such a way as to improve a likelihood of multicast groups for which frames are destined being found in the local multicast forwarding table. As a result, the distributed network switch may operate more efficiently at least in some cases.

While the foregoing is directed to embodiments of the present invention, other and further embodiments of the invention may be devised without departing from the basic scope thereof, and the scope thereof is determined by the claims that follow.

What is claimed is:

1. A computer program product, comprising a computer-readable memory having computer-readable program code embodied therewith for multicast miss notification in a distributed network switch that includes a first switch module, the computer-readable program code executable to:
   receive, by a bridge element of the first switch module, a frame destined for a multicast group on a network, wherein the first switch module includes a management controller associated with a global multicast forwarding table that includes a plurality of forwarding entries, wherein the bridge element is associated with a local multicast forwarding table specific to the bridge element and that includes a subset of the plurality of forwarding entries;
   determine that the local multicast forwarding table associated with the bridge element does not include a forwarding entry for the multicast group for which the frame is addressed;
   select a first forwarding entry from the local multicast forwarding table as a candidate for replacing with a forwarding entry for the multicast group for which the frame is destined; and
   send, to the management controller, an indication that the first forwarding entry is the candidate for replacing with the forwarding entry for the multicast group for which the frame is destined, wherein the indication conforms to a predefined frame format comprising a central controlling bridge MAC address field, a source MAC address field, a key field, and a multicast hint field,
   thereby providing multicast miss notification in the distributed network switch and reducing an incidence of multicast groups, to which frames are destined, not being found in the local multicast forwarding table, relative to not sending the management controller any indication of candidate forwarding entries for replacement.

2. The computer program product of claim 1, wherein the management controller is configured to:
   retrieve, from the global multicast forwarding table, the forwarding entry for the multicast group, and wherein the management controller; and
   store the retrieved forwarding entry in the local multicast forwarding table, based on the indication.

3. The computer program product of claim 1, wherein the predefined selection criteria comprises a time that the forwarding entry was last accessed in processing a multicast frame.

4. The computer program product of claim 1, wherein the bridge element comprises a distributed virtual Ethernet bridge (dVEB), and wherein the indication serves as a hint to the management controller which multicast forwarding entry is to replace.

5. The computer program product of claim 1, wherein the indication comprises an index of the first forwarding entry in the local multicast forwarding table, and wherein the forwarding entry for the multicast group for which the frame is destined comprises at least one of a logical network of the multicast group, a virtual local area network (VLAN) of the multicast group, and a Media Access Control (MAC) address for the multicast group.

6. The computer program product of claim 1, wherein the computer-readable program code is further executable to:
   prior to sending the indication to the management controller, send the frame to a broadcast domain associated with the network.

7. The computer program product of claim 1, wherein the bridge element is configured to, upon determining that the local multicast forwarding table associated with the bridge element includes a forwarding entry for a second multicast group for which a second frame is destined, sending the second frame to the second multicast group based on the forwarding entry.

8. A system to provide multicast miss notification in a distributed network switch that includes a first switch module, the system comprising:
   one or more computer processors;
   a memory containing a program, which when executed by the one or more computer processors is configured to perform an operation comprising:
      receiving, by a bridge element of the first switch module, a frame destined for a multicast group on a network, wherein the first switch module includes a management controller associated with a global multicast forwarding table that includes a plurality of forwarding entries, wherein the bridge element is associated with a local multicast forwarding table specific to the bridge element and that includes a subset of the plurality of forwarding entries;
      determining that the local multicast forwarding table associated with the bridge element does not include a forwarding entry for the multicast group for which the frame is addressed;

selecting a first forwarding entry from the local multicast forwarding table as a candidate for replacing with a forwarding entry for the multicast group for which the frame is destined; and sending, to the management controller, an indication that the first forwarding entry is the candidate for replacing with the forwarding entry for the multicast group for which the frame is destined, wherein the indication conforms to a predefined frame format comprising a central controlling bridge MAC address field, a source MAC address field, a key field, and a multicast hint field, thereby providing multicast miss notification in the distributed network switch and reducing an incidence of multicast groups, to which frames are destined, not being found in the local multicast forwarding table, relative to not sending the management controller any indication of candidate forwarding entries for replacement.

9. The system of claim 8, wherein the management controller is configured to:
retrieve, from the global multicast forwarding table, the forwarding entry for the multicast group, and wherein the management controller; and
store the retrieved forwarding entry in the local multicast forwarding table, based on the indication.

10. The system of claim 8, wherein the predefined selection criteria comprises a time that the forwarding entry was last accessed in processing a multicast frame.

11. The system of claim 8, wherein the bridge element comprises a distributed virtual Ethernet bridge (dVEB), and wherein the indication serves as a hint to the management controller which multicast forwarding entry is to replace.

12. The system of claim 8, wherein the indication comprises an index of the first forwarding entry in the local multicast forwarding table, and wherein the forwarding entry for the multicast group for which the frame is destined comprises at least one of a logical network of the multicast group, a virtual local area network (VLAN) of the multicast group, and a Media Access Control (MAC) address for the multicast group.

13. The system of claim 8, wherein the operation further comprises:
prior to sending the indication to the management controller, sending the frame to a broadcast domain associated with the network.

14. The system of claim 8, wherein the predefined selection criteria comprises a time that the forwarding entry was last accessed in processing a multicast frame, wherein the management controller is configured to:
retrieve, from the global multicast forwarding table, the forwarding entry for the multicast group, and wherein the management controller; and
store the retrieved forwarding entry in the local multicast forwarding table, based on the indication.

15. The system of claim 14, wherein the bridge element comprises a distributed virtual Ethernet bridge (dVEB), wherein the indication serves as a hint to the management controller which multicast forwarding entry is to replace, wherein the indication comprises an index of the first forwarding entry in the local multicast forwarding table, and wherein the forwarding entry for the multicast group for which the frame is destined comprises at least one of a logical network of the multicast group, a virtual local area network (VLAN) of the multicast group, and a Media Access Control (MAC) address for the multicast group.

16. The system of claim 15, wherein the bridge element is configured to, upon determining that the local multicast forwarding table associated with the bridge element includes a forwarding entry for a second multicast group for which a second frame is destined, sending the second frame to the second multicast group based on the forwarding entry, wherein the operation further comprises:
prior to sending the indication to the management controller, sending the frame to a broadcast domain associated with the network.

17. The system of claim 16, wherein the local multicast forwarding table is associated with a plurality of predefined data structures including a delayed tracking table, a broadcast table, a multicast tree table, a logical network-VLAN table, an uplink table, a physical link state table, a query pending data structure, a forwarding cache data structure, and a set of next-previous data structures;
wherein the delayed tracking table maintains state information used by a multicast replication engine for operations queued for subsequent processing, whereby the processing of the operations is delayed only upon determining that multicast group information is not available in the local multicast forwarding table, wherein the operations include replicating multicast frames and sending the multicast frames;
wherein the broadcast table is indexed by logical network and virtual local area network and stores a bitmap of switch modules from which to receive broadcast frames for a given broadcast domain;
wherein the multicast tree table stores a bitmap of dVEBs in the distributed network switch, wherein a first bit in the bitmap represents a dVEB containing a port that is a member of a given multicast group.

18. The system of claim 17, wherein the physical link state table stores status information of whether a given physical link is operational;
wherein the query pending data structure maintains a pointer back to an entry in the delayed tracking table, that initiated a query to the management controller, wherein the pointer in effect serves as a breadcrumb back to a source of invoking the query;
wherein the forwarding cache data structure maintains a key for a cached forwarding entry, wherein the key includes a logical network, a VLAN, and a MAC address, wherein the forwarding cache data structure comprises a ternary content addressable memory data structure;
wherein the set of next-previous data structures comprise control structures configured to maintain both used forwarding entries and unused forwarding entries;
wherein the local multicast forwarding table includes the plurality of predefined data structures.

19. The system of claim 18, wherein the central controlling bridge comprises a firmware component that functions as a switch control point configured to receive packets for additional processing by the distributed network switch;
wherein the central controlling bridge MAC address field stores a six-byte MAC address of the central controlling bridge, wherein the source MAC address field stores a six-byte MAC address of a dVEB generating the multicast miss notification, wherein the key field stores a key not found in the forwarding cache data structure, wherein the multicast hint field provides a suggestion as to which entry in the multicast tree table should be replaced upon determining that an entry is to be added to the table responsive to a multicast miss, wherein the key multicast hint field in a given instance specifies an entry least recently used for forwarding;

wherein the predefined frame format further includes a VLAN protocol ID, a VLAN tag, and an ether type field, a control operation code type field, and a frame check sequence, and a plurality of pad fields each storing a respective, predetermined count of bytes of 0x0 values, wherein the pad fields are not contiguous with one another, wherein each entry comprises a forwarding entry.

* * * * *